US011655060B2

(12) United States Patent
Monti

(10) Patent No.: US 11,655,060 B2
(45) Date of Patent: May 23, 2023

(54) METHOD FOR INTRODUCING ARTICLES INTO PACKS

(71) Applicant: MARCHESINI GROUP S.p.A., Pianoro (IT)

(72) Inventor: Giuseppe Monti, Pianoro (IT)

(73) Assignee: MARCHESINI GROUP S.P.A., Pianoro (IT)

(*) Notice: Subject to any disclaimer, the term of this patent is extended or adjusted under 35 U.S.C. 154(b) by 0 days.

(21) Appl. No.: 17/406,376

(22) Filed: Aug. 19, 2021

(65) Prior Publication Data
US 2021/0380293 A1 Dec. 9, 2021

Related U.S. Application Data

(63) Continuation of application No. 15/319,244, filed as application No. PCT/IB2015/054079 on May 29, 2015, now abandoned.

(30) Foreign Application Priority Data

Jun. 18, 2014 (IT) .......................... BO2014A000337

(51) Int. Cl.
*B65B 35/40* (2006.01)
*B65B 39/14* (2006.01)
(Continued)

(52) U.S. Cl.
CPC .............. *B65B 35/405* (2013.01); *B65B 5/06* (2013.01); *B65B 35/40* (2013.01); *B65B 39/14* (2013.01);
(Continued)

(58) Field of Classification Search
CPC ......... B65B 35/405; B65B 5/06; B65B 35/40; B65B 39/14; B65B 57/14; B65B 61/207; B65B 35/44; B65B 39/145; B65G 47/845
(Continued)

(56) References Cited

U.S. PATENT DOCUMENTS

| 2,631,767 A | 3/1953 | Banks | ....................... B65B 5/06 |
| | | | 53/252 |
| 3,821,874 A | 7/1974 | Jones | ..................... B65B 61/20 |
| | | | 53/449 |

(Continued)

FOREIGN PATENT DOCUMENTS

| DE | 33 41 573 A1 | 9/1984 |
| DE | 10 2006 045479 A1 | 4/2008 |

(Continued)

*Primary Examiner* — Sameh Tawfik
(74) *Attorney, Agent, or Firm* — R. Neil Sudol; Henry D. Coleman

(57) ABSTRACT

The apparatus (100) for introducing deformable products (B), such as blister packs and informative sheets (F), internally of relative packs (A) comprises first pusher elements (11), mounted on a first looped conveyor organ (1), and first movement means (3), associated to the first conveyor organ (1) for moving the first pusher elements (11), transversally to the advancement direction (V1) thereof, so that they can abut the products (B) and push the products (B) internally of relative packs (A). The apparatus (100) comprises second pusher elements (21) mounted on a second looped conveyor organ (2) which is arranged with respect to the first conveyor organ (1) such that the second pusher elements (21) are arranged above the corresponding first pusher elements (11). Second movement means (4), associated to the second conveyor organ (2), are included for moving the second pusher elements (21), transversally to the advancement direction (V2) thereof, so that they can abut the sheets (F) and push the sheets (F) internally of relative packs (A).

7 Claims, 6 Drawing Sheets

(51) Int. Cl.
  *B65B 61/20* (2006.01)
  *B65G 47/84* (2006.01)
  *B65B 5/06* (2006.01)
  *B65B 57/14* (2006.01)

(52) U.S. Cl.
  CPC ............ *B65B 57/14* (2013.01); *B65B 61/207* (2013.01); *B65G 47/845* (2013.01)

(58) Field of Classification Search
  USPC ......................................................... 53/405
  See application file for complete search history.

(56) References Cited

U.S. PATENT DOCUMENTS

| | | | | |
|---|---|---|---|---|
| 4,250,693 A | 2/1981 | Andersson | ............. | B65B 5/024 53/207 |
| 4,492,070 A | 1/1985 | Morse | ................... | B65B 39/007 53/438 |
| 4,936,077 A | 6/1990 | Langen | ................. | B65B 35/405 198/418.2 |
| 4,982,556 A * | 1/1991 | Tisma | ................. | G07F 17/0092 53/154 |
| 5,175,976 A | 1/1993 | Petry | ....................... | B65B 39/14 53/252 |
| 5,185,984 A | 2/1993 | Tisma | ................... | B65B 59/005 53/252 |
| 5,657,610 A * | 8/1997 | Dietrich | .................. | B65B 23/22 53/139.5 |
| 5,692,361 A * | 12/1997 | Ziegler | .................... | B65B 5/106 53/157 |
| 5,787,680 A | 8/1998 | Tisma | ....................... | B65B 5/06 53/244 |
| 6,202,392 B1 * | 3/2001 | Greenwell | ............ | B65B 25/141 53/566 |
| 6,866,140 B2 | 3/2005 | Iwasa | ...................... | B65B 5/064 198/803.13 |
| 6,907,979 B2 | 6/2005 | Ford | ....................... | B65B 35/30 198/419.3 |
| 6,993,889 B2 | 2/2006 | Ford | ....................... | B65B 5/106 53/237 |
| 7,716,902 B2 | 5/2010 | Simm | .................... | B65G 47/82 53/445 |
| 8,657,555 B2 | 2/2014 | Kokubo | ................. | B65H 31/20 271/215 |
| 10,850,879 B2 * | 12/2020 | Bellante | ............. | B65B 35/405 |
| 2008/0209867 A1 * | 9/2008 | Lidington | ............ | B65B 35/205 53/566 |
| 2013/0180207 A1 | 7/2013 | Monti | ....................... | B65B 5/00 53/235 |

FOREIGN PATENT DOCUMENTS

DE  10 2008 010896 A1  8/2009
EP  2615038 A1  7/2013

* cited by examiner

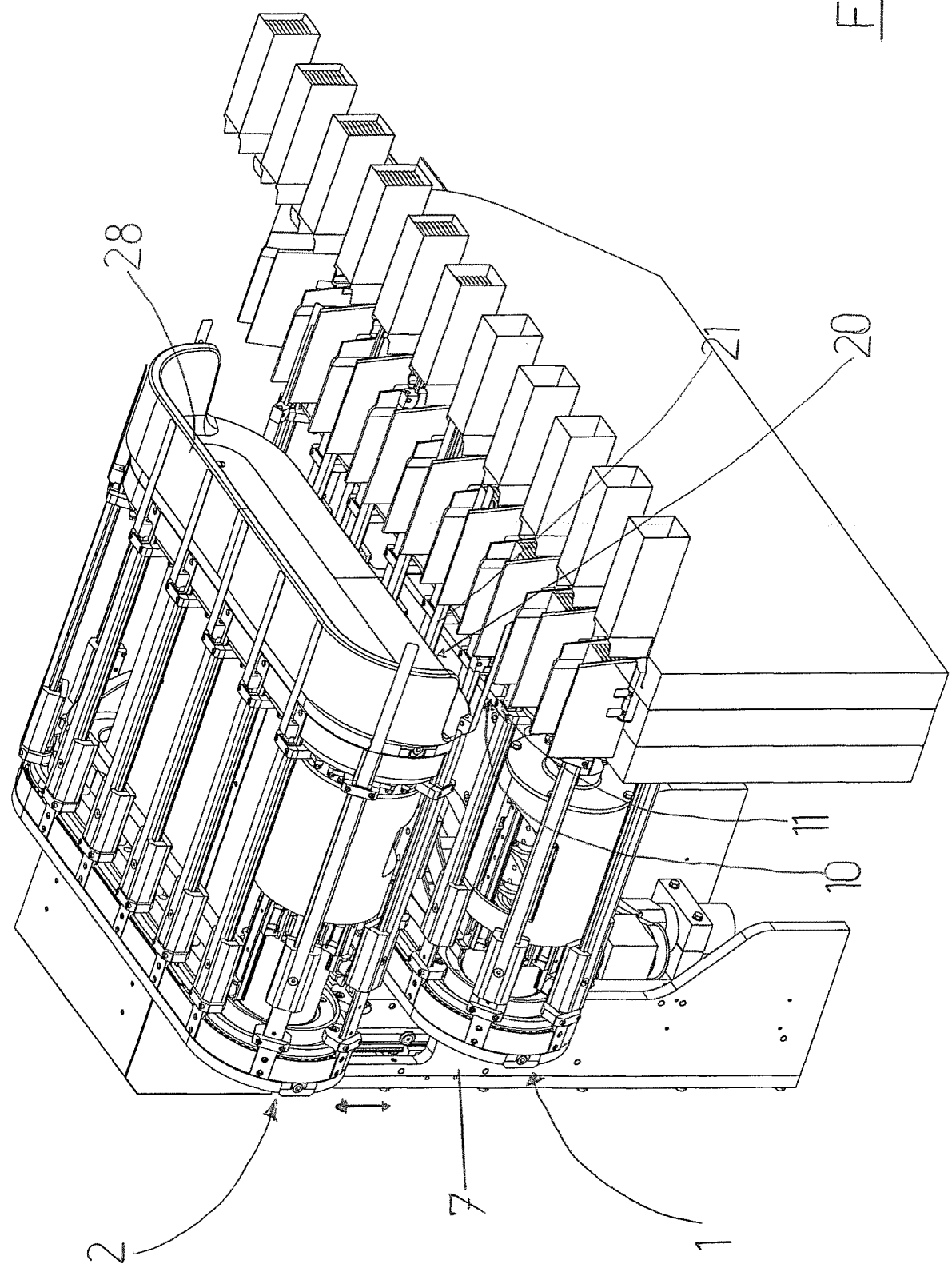

METHOD FOR INTRODUCING ARTICLES INTO PACKS

FIELD OF THE INVENTION

The present invention relates to the technical sector concerning automatic packing of articles internally of relative packs or containers, in particular packing articles comprising a deformable product and a relative informative sheet which have to be contemporaneously inserted in a relative pack.

For example, the apparatus disclosed by the present invention can find application in the packing of deformable products, such as blister packs, containing pharmaceutical products, which must be inserted together with a relative informative sheet internally of relative packs.

Description of the Prior Art

In this regard, automatic machines predisposed to carry out packing of articles which include a deformable product, such as for example a blister pack, and a relative informative sheet which must be inserted in a same pack, comprise a conveyor for continuous transport of the packs arranged one following another in an opened-out pack and with the relative heads open to enable inserting of the products and the sheets, and a conveyor for continuous transport of the products, flanked to the conveyor of the packs and activated in synchrony therewith, so that the products are transported facing the opened heads of the packs, and advanced with the same advancement velocity thereof.

The machines further include a conveyor for continuous transport of informative sheets, which is predisposed and actuated in synchrony with the first two conveyors, so as to position the informative sheets in such a way that they are arranged vertically and facing the open heads of the packs, interposed between the products and the packs, advancing with the same velocity as the products and packs.

The inserting of the products and the sheets in the packs is therefore done while the packs, the products and the sheets are in continuous advancement.

While advancing continuously and in synchrony with the continuous advancement of the packs, the products and the sheets must be moved transversally of the advancing direction thereof appropriately so as to be introduced into the packs.

With the aim of preventing undesired bowing of the products (for example the blister packs are particularly flexible), the insertion must be done without the products abutting and impacting against the informative sheets, before the complete insertion thereof in the packs; therefore the introduction of the sheets and the products in the packs must be done without reciprocal contact between them.

The sheets are the first which have to be, introduced and pushed into the packs so as to be able to be introduced in the packs, the sheets are pushed into the open head of the packs in such a way as to fold on themselves, forming a sort of U-shape with the folded flaps which slide internally of the packs in contact with relative opposite walls; the products must then be introduced into the packs with a slight delay with respect to the sheets so as to remain between the two folded flaps thereof.

A known apparatus used for introducing deformable products (such as for example blister packs) with a relative informative sheet internally of corresponding packs comprises first pusher elements, for moving and pushing the products of the relative conveyor internally of the packs, and second pusher elements, for moving and pushing the informative sheets from the relative conveyor internally of the packs.

Both the first and the second pusher elements are borne and moved by a single same looped conveyor organ which is positioned by a flank of the conveyors of the products, the sheets and the packs.

The looped conveyor organ comprises a pair of chains, loop-wound about relative actuating crown wheels/cogwheels, and a series of rods or bars arranged and fixed transversally between the pair of chains: the looped conveyor is predisposed such that the upper branch of the pair of chains is at a level corresponding to the level of the conveyors of the products, the sheets and the packs.

In particular, with the apparatus each pusher elements of the first pusher elements is borne by a relative carriage mounted translatably on one or a pair of the rods/bars fixed to the pair of chains of the conveyor, and each pusher element of the second pusher elements is predisposed above a corresponding pusher element of the first pusher elements and mounted and constrained, via a respective kinematic mechanism, to the carriage on which the first pusher element is mounted.

The kinematic mechanism is predisposed such that the second pusher element can perform a roto-translating movement with respect to the first pusher element and move from a rest position, in which it is in a retracted position with respect to the first pusher element, into a more advanced position with respect thereto.

The pair of chains of the loop conveyor is activated in synchrony with the product conveyors, the informative sheets and the packs so that when the first pusher elements and the second pusher elements follow the upper branch of the pair of chains, the first pusher elements and the second pusher elements are facing the products and the informative sheets, and advance at the same advancement velocity as the sheets, with the second pusher elements which, via the relative kinematic mechanisms, are each arranged superiorly of a corresponding first pusher element.

The carriages, which bear the first pusher elements, are inferiorly provided with relative rollers for sliding internally of relative cam pathways: in this regard the apparatus comprises a first cam pathway, usable for making the first and second pusher elements inoperative and maintaining them in a retracted position with respect to the products and the sheets, and a second cam pathway, usable for making the first and second pusher elements operative so that they can push the products and the sheets for inserting them into the packs.

The first cam pathway develops and exhibits a progression such that when the rollers of the carriages engage with the first cam pathway, the carriages maintain, with respect to the relative rods during the activating of the chains, an inoperative retracted position at which the first pusher elements and the second pusher element, via the relative kinematic mechanisms, are in a retracted position with respect to the product conveyors, the sheets and the packs.

The second cam pathway, on the other hand, has a curved progression and develops such that when the rollers of the carriages of the rods following the upper branch of the pair of chains engage with the second cam pathway, the carriages are forced:

first to carry out a first translation along the rods, transversally of the conveyor, towards the conveyor of the packs, so that the first pusher elements are translated transversally above the conveyor the products up to reaching an extreme advanced position at which they are inserted in the packs, at the same time maintaining the synchrony of advancement with the conveyors, so as to push the products transversally to the advancement direction thereof and introduce them into the packs, and then to perform a second translation in an opposite direction, distancing from the conveyors of the packs and the products so as to be repositioned in the above-mentioned inoperative retracted position.

During the first translation of the carriages, the kinematic mechanism of each second pusher element is actuated so as to move the second pusher element, with respect to the first pusher element, into a more advanced position so that it is more advanced with respect to the first pusher element and can first abut the informative sheet and push it internally of the pack with a slight phase advance with respect to the moment in which the first pusher elements contacts the product and begins pushing it into the pack (in this way the sheet is introduced into the pack before the first pusher element contacts and begins pushing the product).

For this purpose, each kinematic mechanism, by means of which the second pusher element is associated to and mount on a relative first pusher element, is also provided with a sliding organ for sliding in a cam guide associated to the second cam pathway such as to activate the kinematic mechanism and determine the roto-translation of the second pusher element with respect to the first pusher element: the second pusher element rotates and translates forward with respect to the first pusher element, becoming predisposed in a more advanced position with respect thereto.

The cam guide has a progression such that during the second translation of the carriages in the opposite direction for extracting the first pusher elements from the packs, the kinematic mechanism is forced to return the second pusher element into the original retracted position thereof so as to extract the second pusher element from the pack.

An apparatus of the above type has certain drawbacks.

Firstly, it has a rather complex structure concerning the movement of the second pusher elements by means of the relative kinematic mechanism: each time they perform an insertion of a sheet they must perform a roto-translation with respect to the first pusher elements so as to be positioned, with respect thereto, in a more advanced position, then to carry out the opposite movement in order to be repositioned in the initial retracted inoperative position thereof.

The pair of chains of the closed loop conveyor on which the first and second pusher elements are mounted must then be actuated with a high movement velocity as they must be actuated in synchrony with the conveyor of the products, the sheets and the packs which are continuously moved at high velocity, in order to guarantee high productivity performance in packing the packs.

However, the activating of the high-velocity closed loop conveyor can create problems as the assembly constituted by the carriages-first pusher elements-kinematic mechanism-second pusher elements is rather heavy and the centrifugal force generated thereon can lead to negative consequences on the effective positioning of the second pusher elements, i.e. problems during the roto-translation thereof with respect to the first pusher elements.

Lastly, an apparatus such as the one described herein above, in a case of format change of the packs, for example when more than one product is to be inserted in stack configuration internally of a larger pack (for example inserting a plurality of blister packs superposed on one another instead of a single blister pack) a significant part of the kinematic movement mechanism of the second pusher elements must be replaced and redesigned so that when the second pusher elements have to intervene and perform the roto-translation movement thereof, they are positioned superiorly and at the correct distance from the first pusher elements on the basis of the effective height of the stack of products which must be transferred into the packs.

SUMMARY OF THE INVENTION

The aim of the present invention is to provide an apparatus for introducing articles into relative packs able to obviate the above-mentioned drawbacks.

In particular, an aim of the present invention is to provide an apparatus able to effectively carry out a contemporary introduction of a sheet and at least a product internally of a pack, without reciprocal contact, even when the sheets, products and packs are advanced continuously at a high velocity.

The cited aims are obtained with an apparatus for introducing articles into respective packs as described and claimed herein.

Other advantageous characteristics of the apparatus disclosed by the present invention are set out in the dependent claims.

In particular, in one of these further characteristics, the apparatus of the present invention is particularly versatile, as in a case of format change of the packs and/or the number of products to be inserted in a same pack, it does not request replacement activities of components and/or assembly or predisposing of new components.

BRIEF DESCRIPTION OF THE DRAWINGS

The characteristics of a preferred embodiment of the apparatus for introducing articles, comprising deformable products and informative sheets which must be inserted together with products into relative packs, disclosed by the present invention, are described in the following with reference to the accompanying tables of drawings, in which:

FIG. 2 illustrates, with respect to FIG. 1, some significant components of the disclosed apparatus, while the sheets between the conveyor of the blister packs and the conveyor of the packs, have been omitted for reasons of clarity;

FIG. 4 schematically illustrates a view from above of the apparatus of the present invention, while

FIG. 6 schematically illustrates, according to the perspective view of FIG. 3, the apparatus of the present invention in a particular configuration which it can assume in a case of a change format of the packs and of insertion internally thereof of a plurality of blister packs arranged in a stack with one another.

DESCRIPTION OF THE PREFERRED EMBODIMENTS

Figure 1:
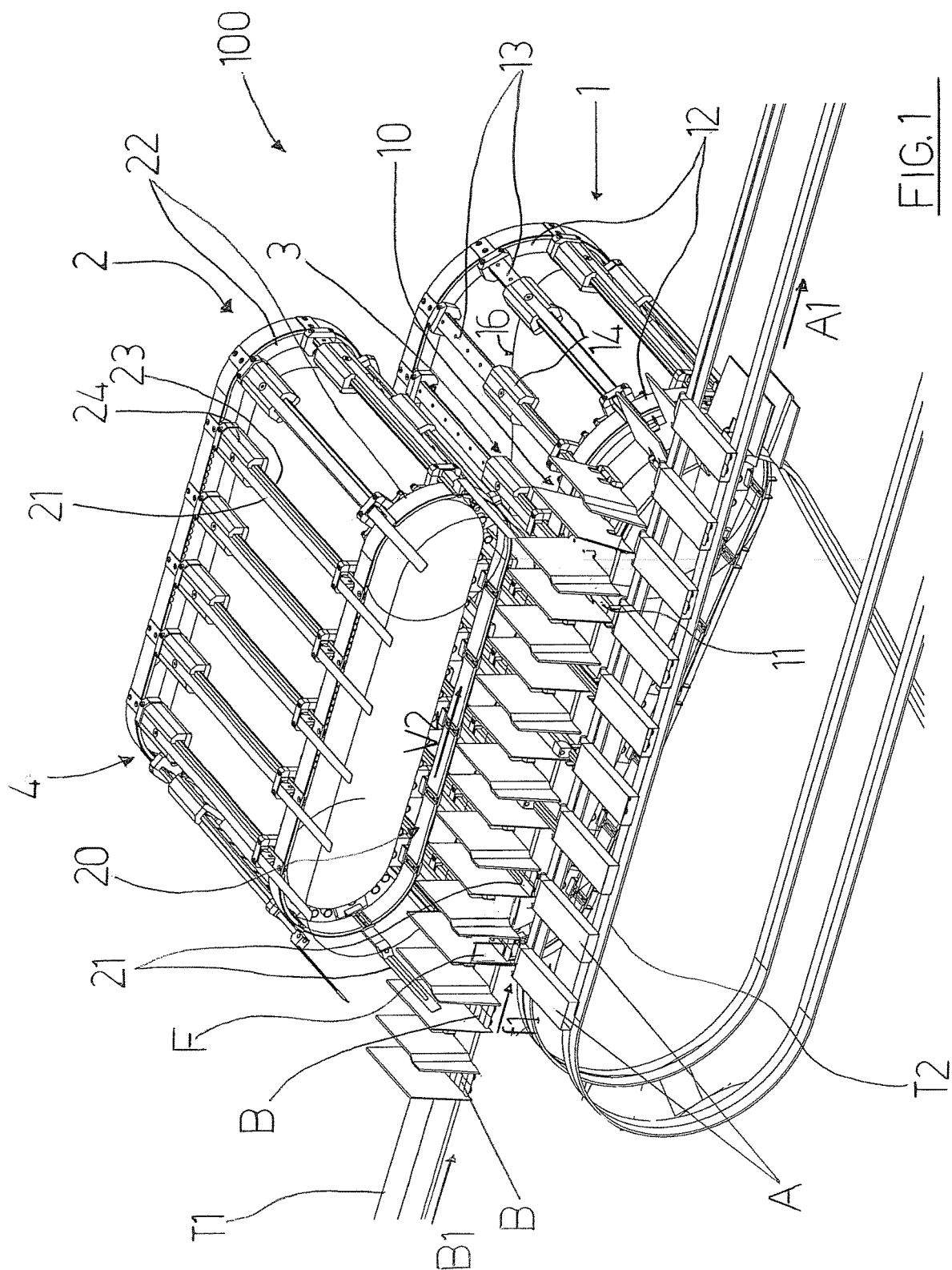
FIG. 1 illustrates, in a schematic perspective view, the apparatus of the present invention, in a possible preferred use thereof, in an automatic packing machine of deformable products, constituted by blister packs, with relative informative sheets, internally of relative packs; in this case it is illustrated in a position thereof flanked to an advancement conveyor of blister packs which is flanked to an advancement conveyor of the packs; informative sheets (illustrated schematically as rectangles) are also advanced between the conveyor of the blister packs and the conveyor the packs, which sheets are to be introduced by the apparatus internally of the packs together with the blister packs.

With reference to the accompanying figures of the drawings, reference numeral (100) relates to an apparatus for introducing articles, comprising deformable products and informative sheets which must be inserted together with products into relative packs, disclosed by the present invention in its entirety.

The apparatus (100) is particularly applicable in automatic packing machines which carry out inserting of articles in relative packs when the articles to be inserted in the packs contemporaneously comprise a present of deformable products, such as blister packs (B), and relative informative sheets.

In the case of packing machines of blister packs in relative packs, the inserting of the blister packs (B) and the informative sheets (F) internally of the packs (A) is done when the blister packs (B), the sheets (F) and the relative packs (A) are advanced continuously in synchrony with one another, and the insertion can be done, as evidenced in the foregoing, in such a way as to be able to insert a blister pack (B) and the relative sheet (F) internally of the pack (A) without their coming into reciprocal contact.

The situation that occurs in automatic packing machines, when the blister packs (B) and the relative sheets (F) are to be inserted internally of corresponding packs (A), is substantially the situation schematically illustrated in FIG. 1.

The blister packs (B) are arranged one following another on a relative conveyor (T1) and are advanced continuously along an advancement direction (B1), while the packs (A) are arranged one following another on a relative conveyor (T2) and are advanced continuously along an advancement direction (A1) parallel to the advancement direction (B1) of the blister packs (B) and in synchrony therewith, so that each pack (A) is facing a relative product (B).

As for the informative sheets (F), they are also advanced continuously along an advancement direction (f1), between the blister packs (B) and the packs (A), and in synchrony with one another, so that each sheet (F) is interposed between a blister pack (B) and a pack (A).

The apparatus (100) of the present invention for performing the inserting of the blister packs (B) advancing continuously along a conveyor (T1) internally of the packs (A), also continuously advancing along a conveyor (T2), contemporaneously with the inserting of the sheets (F) advancing continuously interposed between the blister packs (B) and the packs (A), is ordered and structured so as to be positionable and to operate by a side of the conveyor (T1) of the blister packs (B), as described in the following.

In this regard, the apparatus (100) comprises a first loop-wound conveyor organ (1), positioned by a side of the conveyor (T1) of the products (B), the first conveyor organ (1) comprising at least a straight conveying branch (10) and being arranged such that the straight conveying branch (10) is situated at a level corresponding to a level of the conveyor (T1) of the products (B) and is activated continuously, and in synchrony, in an advancement direction that is equal to and parallel to the advancement direction (B1) of the conveyor (T1) of the products (B).

The apparatus (A) is equipped with first pusher elements (11), for pushing and moving the blister packs (B) of the relative conveyor (T1) internally of the packs (A), the first pusher elements (11) being predisposed and mounted on the first conveyor organ (1) in such a way that they can be advanced along the straight conveying branch (10) of the first conveyor organ (1) with an advancement direction (V1) parallel to and in a same direction as the advancement direction (B1) of the blister packs (B), and in synchrony therewith, in such a way that each of them is opposite a relative product (B) advancing on the relative conveyor (T1).

The apparatus (100) comprises first movement means (3), associated to the first conveyor organ (1), for moving the first pusher elements (11) when the first pusher elements (11) are passing on the straight conveying branch (10) of the first conveyor organ (1).

The first movement means (3) are predisposed to move the first pusher elements (11) in a pushing direction transversally to the advancement direction (V1) thereof so as to translate them first, during the advancing thereof along a first portion of the straight conveying branch (10) of the first conveyor organ (1), from a retracted position to an advanced position in such a way as to translate the first pusher elements (11) in the pushing direction transversally with respect to the conveyor (T1) of the blister packs (B) up to the conveyor (T2) of the packs (A) so as to abut the blister packs (B) and push the blister packs (B) in the pushing direction from the relative conveyor (T1) and introduce the blister packs (B) internally of the packs (A) and, subsequently, during the advancing thereof along a second portion subsequent to the first portion of the straight conveying branch (10) of the first conveyor (1), so as to move the first pusher elements (11) in an other direction opposite the pushing direction and transversally to the advancement direction (V1) thereof in order to translate the first pusher elements (11) in the other direction from the advanced position newly to the retracted position, so as to extract the first pusher elements (11) from the packs (A).

Figure 2:
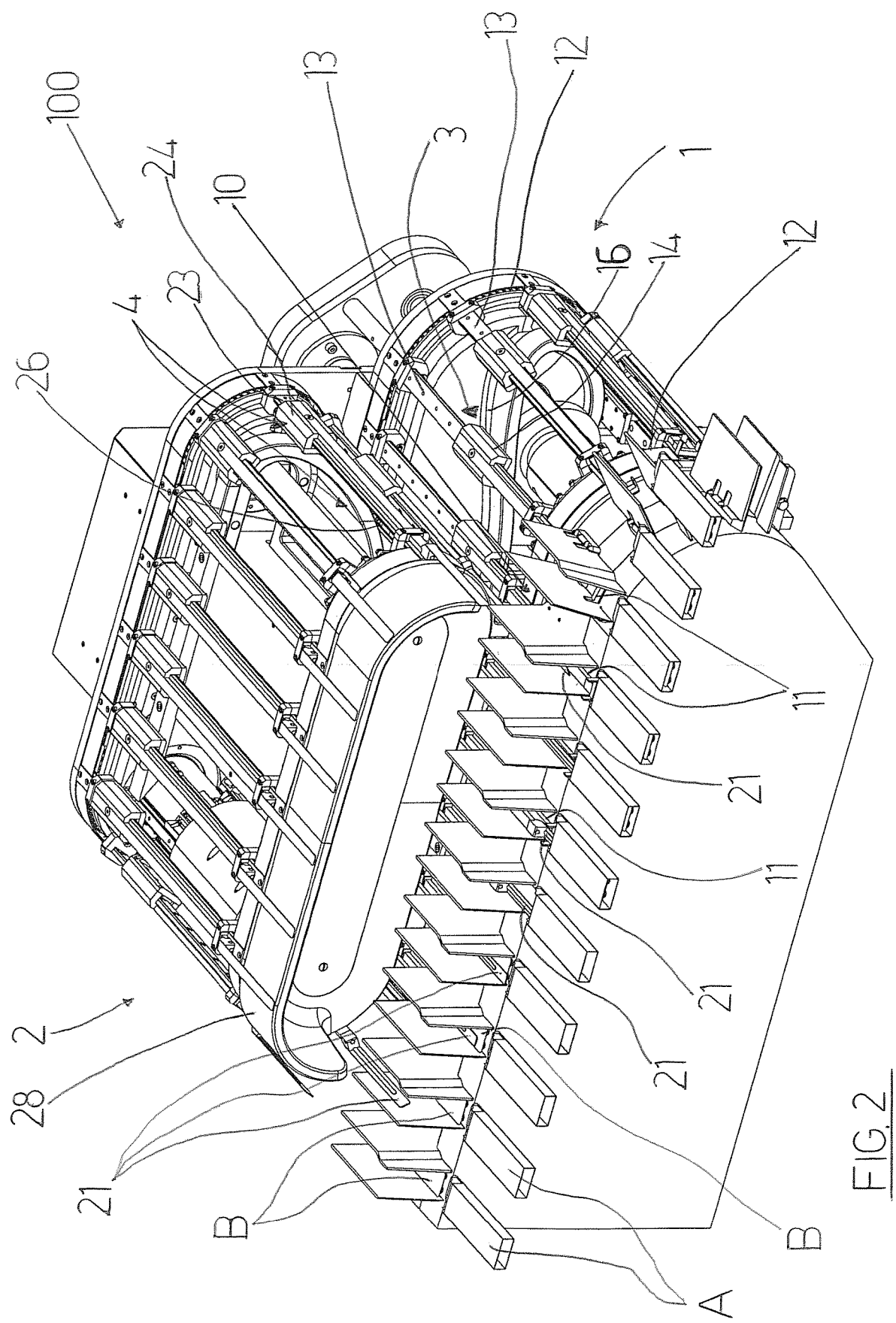
FIG. 2 schematically illustrates, also according to the perspective view of FIG. 1, the apparatus of the present invention.
Figure 3:
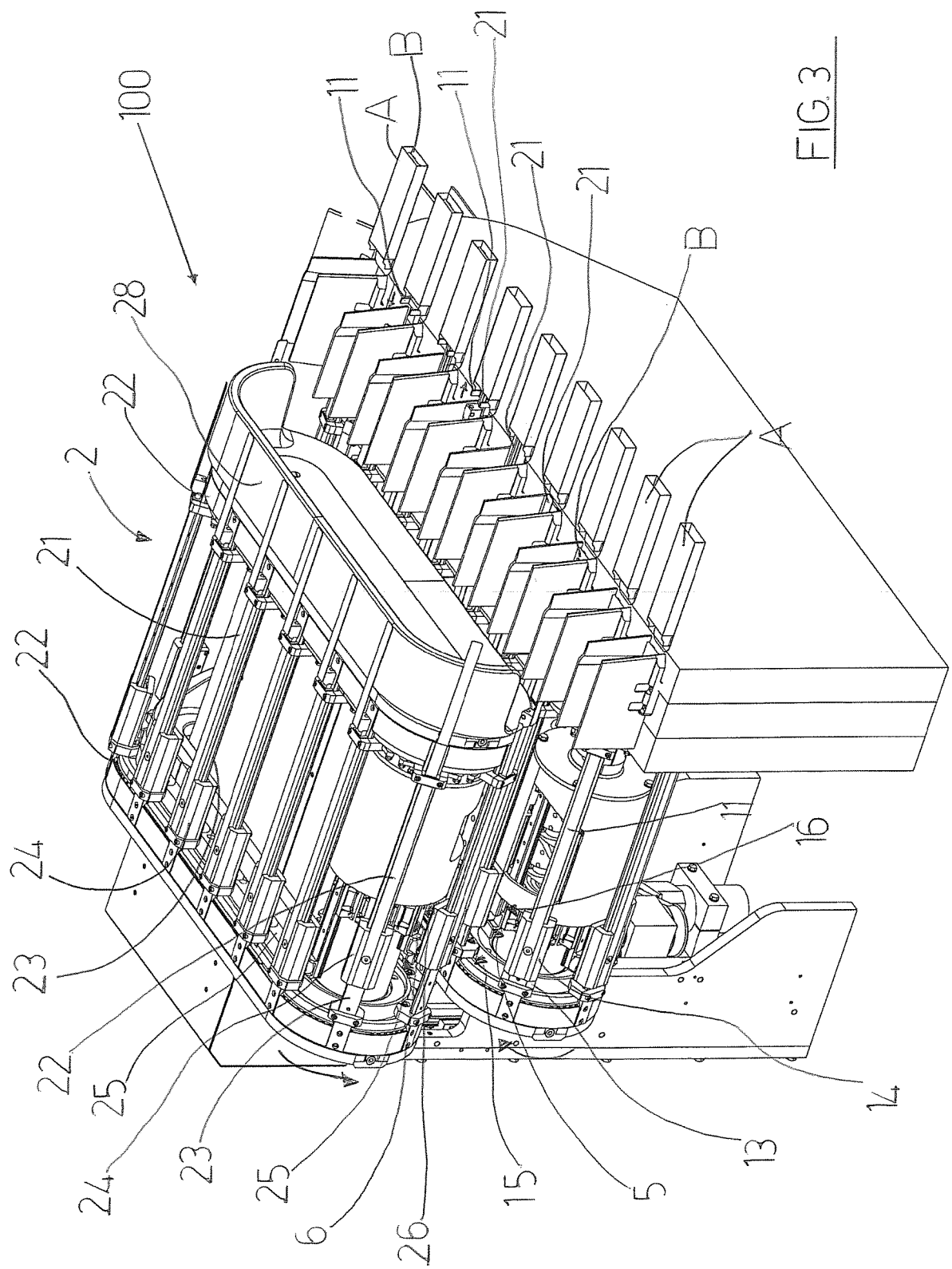
FIG. 3 schematically illustrates the apparatus of the present invention in a different perspective view to that of FIG. 2; also in FIG. 3, like in FIG. 2, the sheets between the conveyor of the blister packs and the conveyor of the packs, have been omitted for reasons of clarity; this has been done also for the following figures.
Figure 4:
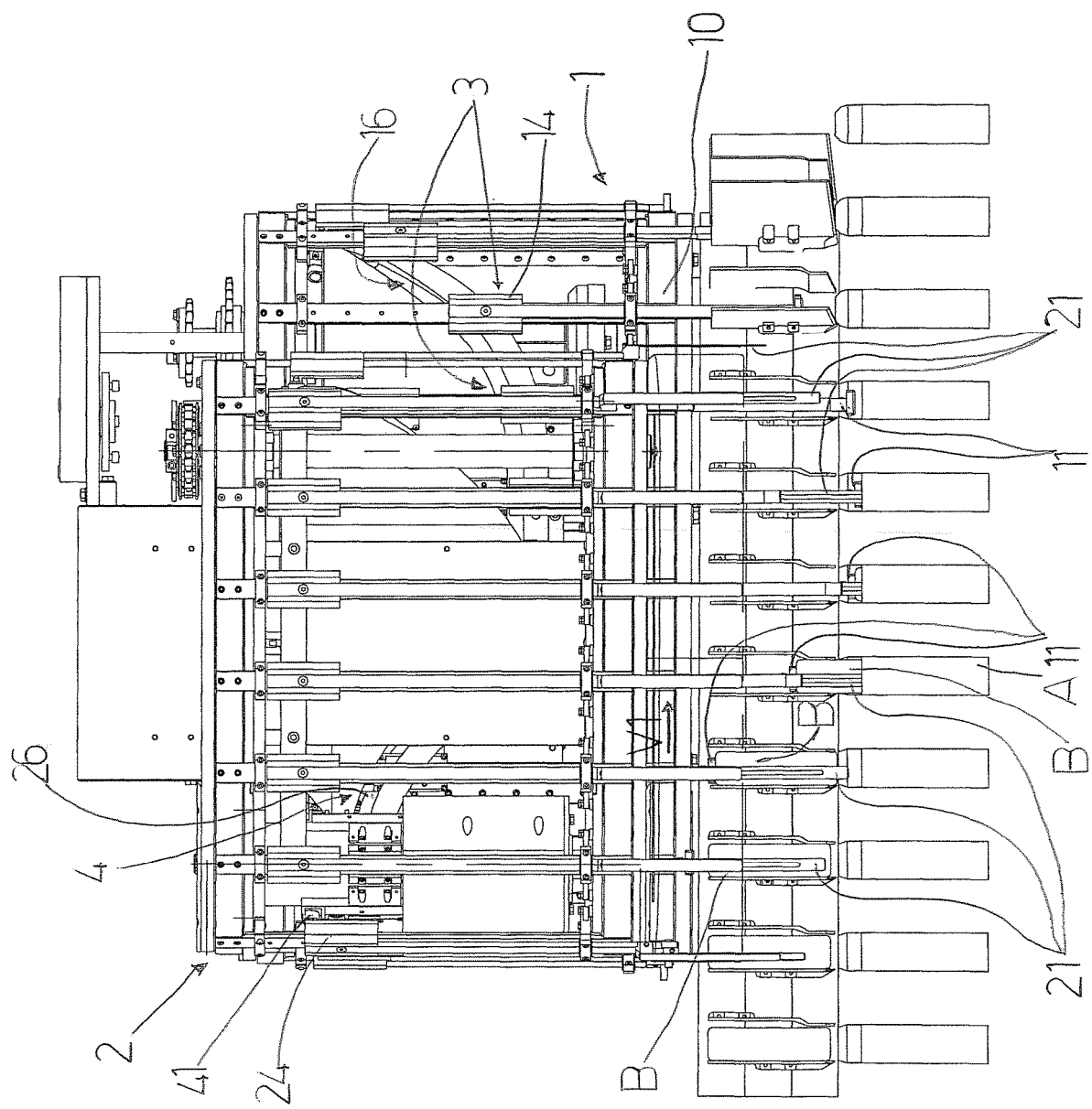

In FIGS. 2 and 4, in particular in FIG. 4, it can be noted that the first pusher elements (11), when following a first portion of the straight conveyor branch (10) of the first conveyor organ (1), first are pushed towards the advanced position thereof so as to abut and push the blister packs (B) from the conveyor (T1) thereof internally of the packs (A), then, when they are following a second portion of the same straight conveyor branch (10), are returned into the retracted position thereof so as to be extracted from the packs (A).

In order to be able to insert the sheets (F) at the same time as the blister packs (B) internally of the boxes (A), the apparatus (100) further comprises also second pusher elements (21).

With the aim of obviating the drawbacks of the prior art, the special characteristics of the apparatus (100) of the present invention consist in the fact that it comprises a second loop-wound conveyor organ (2), the second conveyor organ (2) having at least a straight conveying branch (20) and being arranged with respect to the first conveyor organ (1) such that the relative straight conveying branch (20) is arranged superiorly of and parallel to the straight conveying branch (10) of the first conveyor organ (1), and is activatable continuously, in an advancement direction equal to and parallel to the advancement direction of the straight conveying branch (10) of the first conveyor organ (1), and in synchrony therewith.

The above-mentioned second pusher elements (21) are predisposed and mounted on the second conveyor organ (2) in such a way that they can be advanced along the straight conveying branch (20) of the second conveyor organ (2) with an advancement direction (V2) parallel to and in a same direction as the advancement direction (F1) of the sheets (F), in synchrony therewith, such that each thereof is opposite a relative sheet (F).

Figure 5:
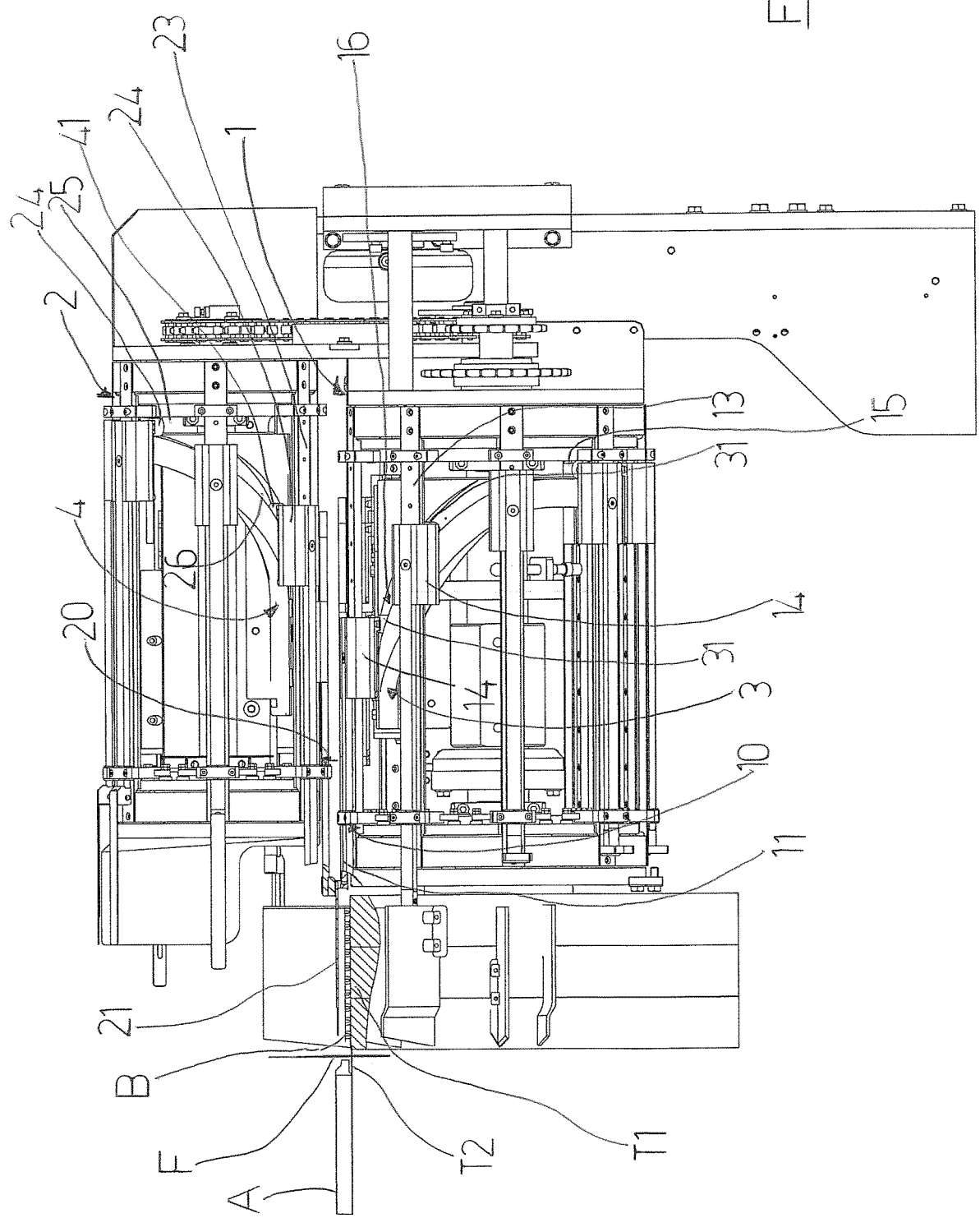
FIG. 5 illustrates a view according to a transversal section performed according to a perpendicular plane to the plane of FIG. 4.

In greater detail, as for example illustrated and visible in detail in FIG. 5, the second conveyor organ (2) is arranged with respect to the first conveyor organ (1), and the second pusher elements (21) are arranged on the second conveyor organ (2) and exhibit an extension such that when the second pusher elements (21) advance along the relative straight conveying branch (20) of the second conveyor organ (2), the second pusher elements (21) are arranged above the corresponding first pusher elements (11) which are advancing along the straight conveying branch (10) of the first conveyor organ (1) and project, with an end thereof, beyond the ends of the first pusher elements (11) so that the second pusher elements (21) are situated at least partially above the product (B) which is to be pushed by the first pusher elements (11) internally of the packs (A).

When the second pusher elements (21) must be moved so as to carry out the inserting of the sheets, this configuration enables them to be already beyond a significant portion of the blister packs so that they can immediately abut the sheets without performing large-entity translations.

In this regard, the apparatus (100) further comprises first movement means (4), specially associated to the first conveyor organ (2), for moving the second pusher elements (21) when the second pusher elements (21) are following the straight conveying branch (20) of the second conveyor organ (2).

The second movement means (4), are predisposed for moving the second pusher elements (21) transversally to the advancement direction (V2) thereof so as to translate them, first, during the advancement thereof along a first portion of the straight conveying branch (20) of the second conveyor organ (2), from a retracted position, at which they are arranged above corresponding first pusher elements (11) and project by an end thereof beyond the end of the first pusher elements (11) so as to be situated above a product (B), to an advanced position such as to translate the second pusher elements (21) in a pushing direction transversally with respect to the advancement direction of the sheets (F) up to the conveyor (T2) of the packs (A), so that the second pusher elements (21) are progressively disposed to an increasing extent within the packs (A) together with the sheets (F) and so as to abut the sheets (F) and push the sheets (F) internally of the relative packs (A), and successively, during the advancing thereof along a second portion successive to the first portion of the straight conveying branch (20) of the second conveyor organ (2) so as to move the second pusher elements (21) in the other direction transversally to the advancement direction (V2) thereof and translate the second pusher elements (21) from the advanced position to the retracted position so as to extract the second pusher elements (21) from the packs (A).

In particular in FIG. 4, it can be noted that the second pusher elements (21), when following a first portion of the straight conveyor branch (20) of the second conveyor organ (2), first are pushed towards the advanced position thereof so as to abut and push the sheets (F) into the packs, then, when they are following a second portion of the same straight conveyor branch (20), are returned into the retracted position thereof so as to be extracted from the packs (A).

In this way, the apparatus (100) of the invention includes the predisposing of the first (11) and second (21) pusher elements on two distinct and independent conveyor organs, the first conveyor organ (1) and the second conveyor organ (2), with relative and independent movement means, the first movement means (3) and the second movement means (4): this enables moving the first (11) and second (21) pusher elements independently of one another, and only with translation movements with respect to the advancement direction thereof along the straight branches of the respective conveyor organs.

The apparatus (100) proposed by the invention can then be activated with a high operating velocity so as to match the high activating velocities of the packing machines, and the problems of the prior-art apparatus are no longer present, which were dictated by the roto-translational movements of the second pusher elements which, by means of kinematic mechanisms, were mounted and predisposed directly on the first pusher elements.

Further, owing to the particular arrangement of the second conveyor organ (2) with respect to the first conveyor organ (1), and the dimensions and extensions of second pusher elements (21) when the second pusher elements (21) advance along the relative straight conveying branch (20) of the second conveyor organ (2), the second pusher elements (21) are arranged above the corresponding first pusher elements (11) which in turn are advancing along the straight conveying branch (10) of the first conveyor organ (1) and are situated at least partially above a corresponding blister pack (B) (see in detail FIG. 4).

This enables the second pusher elements (21), when translated by the relative second movement means (4) to immediately abut and push the sheets (F) before the relative underlying first pusher elements (11), when translated by the relative movement means (3), can abut and push the blister packs towards the packs: in this way the inserting of the sheets and the blister packs into the packs is guaranteed without their going into reciprocal contact.

Other special and advantageous characteristics of the apparatus (100) disclosed by the present invention are set out in the following.

The first conveyor organ (1) comprises a pair of loop-wound belts (12) and a series of support elements (13) arranged and fixed transversally to the belts (12).

The first pusher elements (11) are mounted on relative carriages (14) which are slidably mounted on the support elements (13) while the first movement means (3) comprise rollers (31), mounted idle below the carriages (14), and guide cams (15,16) having a shape such that the rollers (31) of the carriages (14) can slide internally thereof.

The guide cams (15, 16) of the first movement means (3) comprise at least a first sliding pathway (15) and a second sliding pathway (16) alternative to one another for the sliding of the rollers (31) of the carriages (14).

The first sliding pathway (15) is arranged with respect to the belts (12) of the first loop-wound conveyor organ (1) in such a way as to be followed by the rollers (31) of the carriages (14) which bear the first pusher elements (11) at least when the first pusher elements (11) advance along the straight conveyor branch (10) of the first conveyor organ (1), and more in particular also when the first pusher elements (11) advance along other portions of the first conveyor organ (1).

The first sliding pathway (15) exhibits a progression and profile such that when the rollers (31) of the carriages (14), on which the first pusher elements (11) are mounted, follow the first sliding pathway (15), the carriages (14) are forced to maintain a stationary position on the respective support elements (13) such that the first pusher elements (11) are maintained in the corresponding retracted position thereof during advancement thereof along the straight conveying branch (1), and also during the advancement thereof along the remaining portions of the first conveyor organ (1).

On the other hand, the second sliding pathway (16) is arranged with respect to the guide cams (15,16) of the first movement means (3) is arranged with respect to the belts (12) of the first conveyor organ (1) so as to be followed by the rollers (31) of the carriages (14) which bear the first pusher elements (11) only when the first pusher elements (11) advance along the straight conveying branch (10) of the first conveyor organ (1).

In particular the second sliding pathway (16) exhibits a progression and profile such that when the rollers (31) of the carriages (14), on which the first pusher elements (11) are mounted, follow the first sliding pathway (16), the carriages (14) are forced:
  first to translate along the respective support elements (13), transversally to the belts (12) towards the conveyor (T2) of the packs (A) so that the first pusher elements (11) during the advancement thereof along the first portion of the straight conveyor branch (10) are forced to translate transversally to the advancement direction (V1) thereof from the retracted position to the advanced position thereof so that they can encounter the blister packs (B) and push the blister packs (B) up to introducing them into the packs (A),
  and, subsequently, forced to perform an inverse translation on the respective support elements (13), such that the second pusher elements (11), during the advancement thereof along the second straight conveying branch (10), are forced to translate in an opposite direction from the advanced position to the initial retracted position so as to be extracted from the packs (A).

The second conveyor organ (2) in turn comprises a pair of loop-wound belts (22) and a series of support elements (23) arranged and fixed transversally to the belts (22), and the second pusher elements (21) are mounted on relative carriages (24) mounted slidably on the support elements (23).

The second movement means (4) comprise rollers (41), mounted idle below the carriages (24), and guide cams (25, 26) having a shape such that the rollers (41) of the carriages (24) can slide internally thereof.

The guide cams (25, 26) of the first movement means (4) comprise at least a first sliding pathway (25) and a second sliding pathway (26) alternative to one another for the sliding of the rollers (41) of the carriages (14) on which the second pusher elements (21) are mounted.

In particular, the first sliding pathway (25) of the second movement means (4) is arranged with respect to the belts (22) of the second loop-wound conveyor organ (2) in such a way as to be followed by the rollers (41) of the carriages (24) which bear the second pusher elements (21) at least when the second pusher elements (21) advance along the straight conveyor branch (20) of the second conveyor organ (2), and more in particular also when the second pusher elements (21) advance along other portions of the second conveyor organ (2).

The first sliding pathway (26) of the second movement means (4) exhibits a progression and profile such that when the rollers (41) of the carriages (24), on which the second pusher elements (21) are mounted, follow the first sliding pathway (25), the carriages (24) are forced to maintain a stationary position on the respective support elements (23) such that the first pusher elements (21) are maintained in the corresponding retracted position thereof during advancement thereof along the straight conveying branch (20).

On the other hand, the second sliding pathway (26) of the second movement means (4) is arranged with respect to the belts (22) of the second loop-wound conveyor organ (2) so that it can be followed by the rollers (41) of the carriages (24) which bear the second pusher elements (21) only when the second pusher elements (21) advance along the straight conveying branch (20) of the second conveyor organ (2).

In particular the second sliding pathway (26) exhibits a progression and profile such that when the rollers (41) of the carriages (24), on which the first pusher elements (21) are mounted, follow the second sliding pathway (26), the carriages (24) are forced:
  first to translate along the respective support elements (23), transversally to the belts (22) towards the conveyor (T2) of the packs (A) so that the second pusher elements (21) during the advancement thereof along the first portion of the straight conveyor branch (20) are forced to translate transversally to the advancement direction (V2) thereof from the retracted position to the advanced position thereof so that they can abut the blister packs (B) and push the blister packs (B) up to introducing them into the packs (A),
  and, subsequently, forced to perform an inverse translation on the respective support elements (23), such that the second pusher elements (21), during the advancement thereof along the second straight conveying branch (20), are forced to translate in an opposite direction from the advanced position to the initial retracted position so as to be extracted from the packs (A).

In particular the progression and profile of the second sliding pathway (26) of the second movement means (4) with respect to the progression and profile of the second sliding pathway (16) of the first movement means (3) is advantageously such that when both the second pusher elements (21) and the first pusher elements (11) begin to advance along the relative first portions of the straight conveyor branches (10, 20) of the first (1) and the second (2) conveyor organ, one superposed on another, the second pusher elements (21) are forced to translate first with respect to the first pusher elements (11) so that they can immediately abut and begin to push the sheets towards relative packs before the first pusher elements (11) are in turn moved and forced to translate towards the blister packs.

This advantageously enables carrying out the contemporaneous inserting both of the blister packs and the sheets with no risk of reciprocal contact, even at high advancement velocities of the two conveyor organs.

The first pusher elements (11) can be constituted by bars which are mounted on the carriage (14) and include, at the ends of the bars, abutting elements having a suitable shape for abutting the blister packs and pushing them towards the packs without losing contact therewith.

The second pusher elements (21) can be in turn constituted by bars, mounted on the carriages (24), and include plate elements, mounted at the ends of the bars, having an extension such that when the second pusher elements (21) are arranged above corresponding first pusher elements (11), during the advancement thereof along the relative straight conveyor branches (10, 20) of the first (1) and second (2) conveyor organ, the plate elements are arranged in a more advanced position with respect to the abutting elements of the first pusher elements (11) and above the blister packs.

The apparatus (100) further comprises sensor organs (not illustrated in the figures as of known type) for detecting the presence of blister packs (B) on the first conveyor (T1), the presence of relative packs (A) on the second conveyor (T2) facing the blister packs (B) and the presence of corresponding sheets (F) interposed between respective blister packs (B) and relative packs (A) so as to have available information of the need or not to activate the effective translation of the first (11) and second (21) pusher elements on the basis of the signals provided by the sensor organs.

In this regard, the apparatus (100) comprises a first switching device (5) predisposed and associated to the first conveyor organ (1) in a position upstream of the relative straight conveying branch (10) and activatable such as to abut the rollers (31) of the carriages (14) which bear the first pusher elements (11) in such a way as to deviate the rollers (31) either towards the first sliding pathway (15) or towards the second sliding pathway (16) of the guide cams (15, 16) of the first movement means (3).

In particular, when the sensor means detect the non-presence of a blister pack, of the relative sheet and/or a corresponding pack, the first switcher device (5) is activatable to abut the roller (31) of the carriage (14) which bears the pusher element of the first pusher elements (11), which was destined to push the missing blister pack or the sheet associated to a blister pack and/or missing pack, in such a way as to deviate the roller (31) towards the first sliding pathway (15) so that the first pusher element (11) is forced to remain in the retracted position during advancement thereof along the straight conveying branch (10) of the first conveyor organ (1).

On the other hand, when the sensor means detect the correct presence of a blister pack, of the relative pack and the corresponding sheet, the first switcher device (5) is activatable to abut the roller (31) of the carriage (14) which bears the pusher element of the first pusher elements (11) destined to push the blister pack into the relative pack, such as to deviate the roller (31) towards the second sliding pathway (16) of the guide cams (15,16) so that the pusher element is forced to translate transversally to the advancement direction (V1) thereof during the advancing thereof along the straight conveying branch (10) of the first conveyor organ (1) towards the advanced position thereof so as to push the product into the pack.

The apparatus (100) further comprises a second switching device (6) predisposed and associated to the second conveyor organ (2) in a position upstream of the relative straight conveying branch (20) and activatable such as to abut the rollers (41) of the carriages (24) which bear the second pusher elements (21) in such a way as to deviate the rollers (41) either towards the first sliding pathway (25) or towards the second sliding pathway (26) of the guide cams (25, 26) of the second movement means (4).

In particular, when the sensor means detect the non-presence of a blister pack, of the relative pack and the corresponding sheet, the second switcher device (6) is activatable to abut the roller (41) of the carriage (24) which bears the pusher element of the first pusher elements (21) destined to push the missing sheet or the sheet associated to a blister pack and/or missing pack, in such a way as to deviate the roller (41) towards the first sliding pathway (25) so that the pusher element is forced to remain in the retracted position during advancement thereof along the straight conveying branch (20) of the second conveyor organ (2).

On the other hand, when the sensor means detect the correct presence of a blister pack, of the relative pack and the corresponding sheet, the second switcher device (6) is activatable to abut the roller (41) of the carriage (24) which bears the pusher element of the second pusher elements (21) destined to push the blister pack into the relative pack, such as to deviate the roller (41) towards the second sliding pathway (26) of the guide cams (25,26) so that the relative pusher element (21) is forced to translate transversally to the advancement direction (V2) thereof during the advancing thereof along the straight conveying branch (20) of the second conveyor organ (2) towards the advanced position thereof so as to push the product into the pack.

The first switcher device (5) and the second switcher device (6) can comprise actuators or can be realised according to a particular solution disclosed by the same Applicant and object of a corresponding patent application filed on the same date as the present patent application.

The second conveyor organ (2) can comprise a wall or covering (28) which is arranged flanked to the relative belt (22) facing towards the conveyors of the blister packs and the packs at the advancing portions of the plate elements of the second pusher elements (21) different from the relative straight conveyor portion (20), and arranged and having such a shape that the plate elements slide above the wall or covering (28).

This guarantees operator safety, both when the second conveyor (2) is in motion and when it is stationary, as due to the presence of the wall or covering (28) an operator cannot, for any accidental cause, come into contact with the plate elements of the second pusher elements (21).

The second conveyor organ (2) and the first conveyor organ (1) can be predisposed to be mounted on a same frame (7) which is positioned flanked to the conveyor (T1) of the blister packs (B).

In particular, and very advantageously, the second conveyor organ (2) is mounted on the frame (7) in such a way as to be translatable and movable vertically above the first conveyor organ (1) so as to regulate and vary the distance between the relative straight conveying branch (20) and the underlying straight conveying branch (10) of the first conveyor organ (1).

This enables vertically varying and regulating the distance between the second pusher elements (21) and the first pusher elements (11) when they travel along the relative horizontal conveyor branches (10, 20) of the respective conveyor organs (1, 2).

In this way, as illustrated for example in FIG. 6, the apparatus (100) of the present invention can be quickly and rapidly set up for a format change of the packs, which in FIG. 6 have dimensions and volume that are greater as several blister packs are to be inserted stacked on one another, instead of a single blister pack as illustrated in figures from 1 to 5.

In this case the only operation to be performed, but which is extremely simple and immediate, is the replacement of the abutting elements present at the ends of the bars of the first pusher elements (11) which are to be replaced with other suitable shapes to abut and push a stack of blister packs instead of a single blister pack.

The invention claimed is:

1. A packaging method comprising:
   conveying in seriatim and continuously, along a first advancement path, articles that will be packaged;
   conveying in seriatim and continuously, along a second advancement path parallel to said first advancement path, packs to receive respective ones of the articles;
   conveying in seriatim and continuously, along a third advancement path parallel to said first and said second advancement path and between said first and said second advancement path, informative sheets that will be packaged with respective ones of the articles in respective ones of the packs, with said articles, said packs and said informative sheets being conveyed in synchrony with each other;

conveying in seriatim and continuously, along a fourth advancement path parallel to the first advancement path and on a side thereof opposite the third advancement path, first pusher elements in synchrony with said articles and said packs;

conveying in seriatim and continuously, along a fifth advancement path parallel to and directly vertically above the fourth advancement path, second pusher elements in synchrony and in vertical alignment with respective ones of said first pusher elements;

during the conveying of said articles, said packs and said first pusher elements respectively along said first advancement path, said second advancement path and said fourth advancement path, moving said first pusher elements in a pushing direction transversely to said first advancement path, said second advancement path and said fourth advancement path to initially translate the first pusher elements from a first retracted position to a first advanced position abutting and pushing respective ones of the articles in the pushing direction sufficiently to insert the respective ones of the articles completely inside respective ones of the packs and subsequently translating the first pusher elements in an other direction opposite the pushing direction to extract the first pusher elements from the packs;

during the conveying of said articles, said packs, said informative sheets, said first pusher elements and said second pusher elements respectively along said first, second, third, fourth and fifth advancement path, moving said second pusher elements in said pushing direction and transversely to said fifth advancement path to initially translate the second pusher elements from a second retracted position, at which the second pusher elements are spaced in said pushing direction from respective ones of the packs and arranged above corresponding ones of said first pusher elements and project beyond ends of respective ones of said first pusher elements above respective ones of said articles, to a second advanced position to enable: (i) the second pusher elements when moved to the second advanced position to abut the informative sheets before the first pusher elements abut the articles, (ii) the second pusher elements to abut and push respective ones of the informative sheets in the pushing direction sufficiently to insert the respective ones of the informative sheets completely inside respective ones of the packs above respective ones of the articles and (iii) subsequent translation of the second pusher elements in the other direction opposite the pushing direction to extract the second pusher elements from the packs, whereby the second pusher elements, when translated by the respective second movement means, immediately abut and push respective ones of the sheets before the respective underlying first pusher elements, when translated by the respective first movement means, can abut and push the articles towards the packs, whereby the inserting of the sheets and the articles into the packs is guaranteed without reciprocal contact.

2. The packaging method of claim 1, further comprising arranging the articles along said first advancement path on a first conveyor, and disposing the informative sheets each along said third advancement path in alignment with a respective one of said articles and a respective one of said packs.

3. The packaging method of claim 2, further comprising providing said first pusher elements on a loop-wound or endless conveyor having at least one straight conveying branch or section oriented along said fourth advancement path, said at least one straight conveying branch or section being situated at a level corresponding to a level of said articles along said first advancement path, the conveying of said first pusher elements along said fourth advancement path including operating said loop-wound or endless conveyor to move said first pusher elements along said fourth advancement path to align each of said first pusher elements with a respective one of said articles and a respective one of said packs.

4. The packaging method of claim 3, further comprising providing said second pusher elements on an other loop-wound or endless conveyor having at least one linear conveying branch or section oriented along said fifth advancement path, said at least one linear conveying branch or section being situated at a level above the level of said articles along said first advancement path, the conveying of said second pusher elements along said fifth advancement path including operating said other loop-wound or endless conveyor to move said second pusher elements along said fifth advancement path in synchrony with conveyance of said packs along said second advancement path and conveyance of said informative sheets along said third advancement path to align each of said second pusher elements with a respective one of said informative sheets and a respective one of said packs.

5. The packaging method of claim 4 wherein the moving of said second pusher elements from said second retracted position to said second advanced position is performed during advancing of said second pusher elements along a first portion of said at least one linear conveying branch or section, the moving of said second pusher elements to extract the second pusher elements from the packs being carried out during advancing of said second pusher elements along a second portion of said at least one linear conveying branch or section.

6. The packaging method of claim 4 wherein the loop-wound or endless conveyors respectively supporting said first pusher elements and said second pusher elements are mounted on a common frame positioned by a flank of said first conveyor, said other loop-wound or endless conveyor being mounted on the frame to enable vertical shifting thereof above the loop-wound or endless conveyor supporting the first pusher elements, further comprising changing a vertical position of said other loop-wound or endless conveyor to thereby adjust a vertical distance between said second pusher elements and said first pusher elements.

7. The packaging method of claim 3 wherein the moving of said first pusher elements from said first retracted position to said first advanced position is performed during advancing of said first pusher elements along a first portion of said at least one straight conveying branch or section, the moving of said first pusher elements to extract the first pusher elements from the packs being carried out during advancing of said first pusher elements along a second portion of said at least one straight conveying branch or section.

* * * * *